United States Patent
Ding et al.

(10) Patent No.: US 7,488,230 B2
(45) Date of Patent: Feb. 10, 2009

(54) MANUFACTURING METHOD OF DISPLAY PANEL AND SEALING LAYER MATERIAL THEREOF

(75) Inventors: Jau-Min Ding, Taipei (TW); Lung-Pin Hsin, Jhudong Township, Hsinchu County (TW); Chi-Chang Liao, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 500 days.

(21) Appl. No.: 11/391,776

(22) Filed: Mar. 28, 2006

(65) Prior Publication Data

US 2007/0173166 A1    Jul. 26, 2007

(30) Foreign Application Priority Data

Jan. 25, 2006    (TW)    .............................. 95102751 A

(51) Int. Cl.
*H01J 9/00*    (2006.01)
*G02F 1/1339*    (2006.01)
(52) U.S. Cl. .......................... 445/23; 349/153; 428/1.5
(58) Field of Classification Search ............. 445/23–25; 349/153; 428/1.5
See application file for complete search history.

(56) References Cited

U.S. PATENT DOCUMENTS

| 2004/0219306 A1 | 11/2004 | Wang et al. ................. 428/1.5 |
| 2005/0099575 A1 | 5/2005 | Liang ......................... 349/153 |

FOREIGN PATENT DOCUMENTS

| CN | 1257905 | 6/2000 |
| CN | 1466013 | 1/2004 |

OTHER PUBLICATIONS

Ren, Hongwen et al., "Influence of Liquid Crystal Content on Electro-Optical Properties of Polymer/Liquid Crystal Compound—Film Transition From Normal to Reverse Mode" China Academic Journal Electronic Publishing House, vol. 14, No. 1, Mar. 1999, pp. 12-17.

*Primary Examiner*—Joseph L Williams
(74) *Attorney, Agent, or Firm*—J.C. Patents

(57) ABSTRACT

A method of manufacturing a display panel is described. A substrate is provided. A wall structure is formed on the substrate to define several microcups. A display medium is filled into the microcups. Thereafter, a sealing layer is formed over the microcups filled with the display medium, wherein the sealing layer includes a first material that is immiscible with the display medium and a second material that is miscible with the display medium. A treatment process is performed such that the first material is solidified to form a solidifying layer while the second material miscible in the display medium undergoes a polymerization induced phase separation reaction so as to precipitate in the display medium.

22 Claims, 9 Drawing Sheets

MANUFACTURING METHOD OF DISPLAY PANEL AND SEALING LAYER MATERIAL THEREOF

CROSS-REFERENCE TO RELATED APPLICATION

This application claims the priority benefit of Taiwan application serial no. 95102751, filed on Jan. 25, 2006. All disclosure of the Taiwan application is incorporated herein by reference.

BACKGROUND OF THE INVENTION

1. Field of Invention

The present invention relates to a manufacturing method of a display panel and a sealing layer material thereof. More particularly, the present invention relates to a manufacturing method of a micro-cup liquid crystal display panel and a sealing layer material thereof.

2. Description of Related Art

Currently, the flat panel display has being developed to have a large area, and meanwhile, the flat panel display which is lighter, thinner, and more flexible becomes the main purpose of the future displays, while a micro-cup liquid crystal display is a type of display which achieves the purpose of flexibility. A conventional manufacturing method of the micro-cup liquid crystal display comprises forming a wall structure on a substrate to define multiple microcups; filling liquid crystal materials into the microcups to form multiple liquid crystal unit cells; forming a sealing layer and an adhesive layer on the top of each microcup in sequence; and disposing another substrate on the adhesive layer, such that the two substrates are attached. Particularly, a surface treatment is performed on each interface contacted with the liquid crystal materials in the microcups, so as to achieve the purpose of alignment. However, at present, the alignment treatment can be only performed on the bottom surfaces of the microcups and cannot be performed on the sealing layers on the tops of the microcups.

In order to resolve the above-mentioned problems, U.S. Patent Publication No. U.S. 2004/0219306A1 discloses a sealing layer material mainly applicable in an electrophoretic display, for solving the drive characteristic of the electrophoretic display. However, in the method, the high-k photo-polymerization polymer is used as the material of the sealing layer.

Additionally, US Patent Publication No. U.S. 20050099575A1 discloses a sealing layer material for the microcup liquid crystal display panel, wherein the sealing layer is formed of a photo-alignable material. As such, after being irradiated by the linear polarized ultraviolet, the sealing layer material may be aligned. However, in the method, the photo-alignable material must be used as the sealing layer material, thus the selection of sealing layer materials is limited.

SUMMARY OF THE INVENTION

Accordingly, one objective of the present invention is to provide a manufacturing method of a display panel, to solve the problem in the conventional manufacturing method of the microcup liquid crystal display panel that the sealing layer on the top of the microcup structure cannot be aligned.

Another objective of the present invention is to provide a sealing layer material for the display panel, wherein the sealing layer material can be used for both protection and alignment.

In order to achieve the above and other objectives, the present invention provides a manufacturing method of the display panel, which comprises providing a substrate firstly; then, forming a wall structure on the substrate to define multiple microcups; filling a display medium into the microcups; after that, forming a sealing layer on the microcups filled with the display medium, wherein the sealing layer includes a first material that is immiscible with the display medium and a second material that is miscible with the display medium; and finally, performing a treatment process, such that the first material is solidified to form a solidifying layer, while the second material miscible in the display medium undergoes a polymerization induced phase separation reaction so as to precipitate in the display medium.

In one embodiment of the present invention, the density of the first material is lower than that of the display medium.

In one embodiment of the present invention, the materials of the first and second materials are selected from polymers, monomers, prepolymers, and combinations thereof, respectively.

In one embodiment of the present invention, the proportion of the first material falls between 10~99.99% and the proportion of the second material falls between 90~0.01%.

In one embodiment of the present invention, the treatment process includes radiation exposure, heating, or humidity change.

In one embodiment of the present invention, the display medium includes guest-host liquid crystals, twist nematic liquid crystals, or cholesteric liquid crystals.

In one embodiment of the present invention, the second material in the sealing layer is photo-alignable and after the radiation exposure treatment, the second material aligns the display medium.

In one embodiment of the present invention, after the wall structure is formed on the substrate, it further comprises performing an alignment treatment process or a plasma surface modification step on the substrate and the surface of the wall structure.

In one embodiment of the present invention, after the solidifying layer is formed, it further comprises disposing another substrate on the solidifying layer such that it is attached to the substrate. In one embodiment, the surface of the substrate further includes a device layer (e.g. a drive device or an electrode), a color filter layer, or the combination thereof.

In one embodiment of the present invention, before the wall structure is formed, it further comprises forming a device layer (e.g. a drive device or an electrode), a color filter layer, or the combination thereof on the substrate.

In one embodiment of the present invention, after the solidifying layer is formed, it further comprising forming an electrode layer on the solidifying layer, and a cover layer is then formed on the electrode layer.

In one embodiment of the present invention, the method of forming the wall structure on the substrate includes a photolithographic process or a molding process.

In one embodiment of the present invention, the method of filling the display medium into the microcups includes an ink jet printing or coating method.

In one embodiment of the present invention, the method of coating the sealing layer on the microcups includes an ink jet printing or coating method.

The present invention also provides a sealing layer material for a display panel including a first material having an amount of 10~99.99% and a second material having an amount of 90~0.01%. The first material is immiscible with the display medium and is solidified in the process of radiation exposure, heating, or humidity change. The second material is miscible with the display medium and undergoes a polymerization induced phase separation reaction in the process of radiation exposure, heating, or humidity change, so as to precipitate in the display medium.

In one embodiment of the present invention, the density of the first material is not higher than that of the display medium.

In one embodiment of the present invention, the materials of the first and second materials are selected from polymers, monomers, prepolymers, and combinations thereof, respectively.

In the present invention, the first material in the sealing layer of the display panel is solidified to form a solidifying layer through a specific treatment process, and the second material undergoes a polymerization induced phase separation reaction through the specific treatment process, so as to precipitate in the display medium. The solidifying layer is used to protect the display medium, and the precipitate precipitated in the display medium is capable of achieving different alignment effects depending on its structure, so as to be applied to different display modes.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
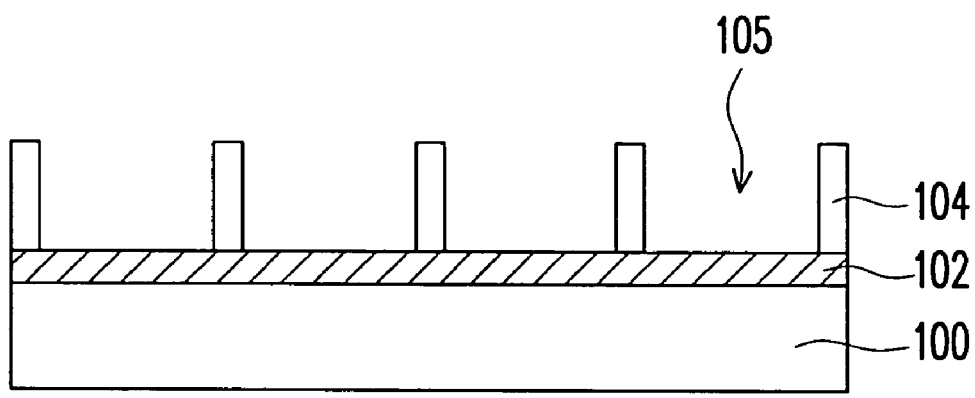
FIGS. 1A-1F show schematic sectional views of the manufacturing flow of a display panel according to one preferred embodiment of the present invention.

FIGS. 1A-1F show schematic sectional views of a manufacturing flow of a display panel according to one preferred embodiment of the present invention. Firstly, referring to FIG. 1A, a substrate 100 is provided. In one embodiment, the substrate 100 is a flexible substrate, such as a polymer plastic substrate. In the present invention, the substrate 100 is not limited to be a flexible substrate, and it may also be a common rigid substrate, such as a glass substrate. In another embodiment, a device layer 102 has been formed on the substrate 100. The device layer 102 formed on the substrate 100 is, for example, an electrode layer or a drive device array layer. More specifically, if the display panel in the present invention is a passive display panel, the device layer 102 mainly includes an electrode layer. If the display panel in the present invention is an active display panel, the device layer 102 mainly includes switching devices and pixel electrodes. The material of the electrode layer and the pixel electrode is, for example, an inorganic transparent conductive material, such as indium tin oxide (ITO) or indium zinc oxide (IZO), or an organic conductive material, such as poly(3,4-ethylene dioxythiophene)/poly(styrene sulfonate) (PEDOT/PSS).

Next, a wall structure 104 is formed on the substrate 100 to define multiple microcups 105. If the provided substrate 100 comprises the device layer 102, the method of forming the wall structure 104 is, for example, a photolithographic process. That is, a photosensitive layer (not shown) is formed on the device layer 102, firstly, and the material is, for example, a polymer, and then a phtolithographic process is performed to pattern the photosensitive layer 104. If the provided substrate is a blank substrate, the method of forming the wall structure 104 may be a molding process, such that the wall structure 104 and the substrate 100 are molded together. In one preferred embodiment, after the wall structure 104 is formed, an alignment treatment process or a plasma surface modification step is further performed on the substrate 100 and the surface of the microcups 105.

Figure 1B:
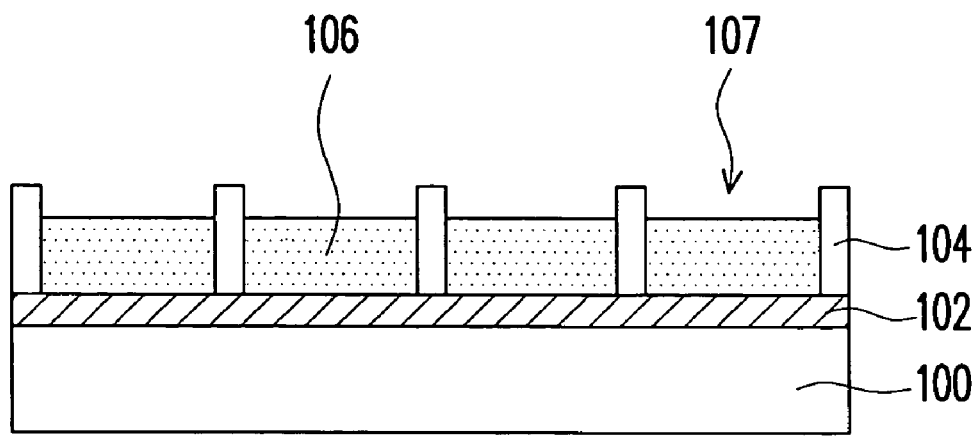

Next, referring to FIG. 1B, a display medium 106 is filled into the microcups 105 to form multiple display unit cells 107 filled with the display medium 106. In one embodiment, the display medium 106 is, for example, liquid crystal molecules, such as guest-host liquid crystals, twist nematic liquid crystals, or cholesteric liquid crystals. In one embodiment, the display medium 106 is, for example, guest-host liquid crystals added with dye. In another embodiment, the display medium 106 is, for example, the twist nematic liquid crystals added with chiral dopant. Additionally, the method of filling the display medium 106 into the microcups 105 is, for example, an ink jet printing or coating method.

Figure 1C:
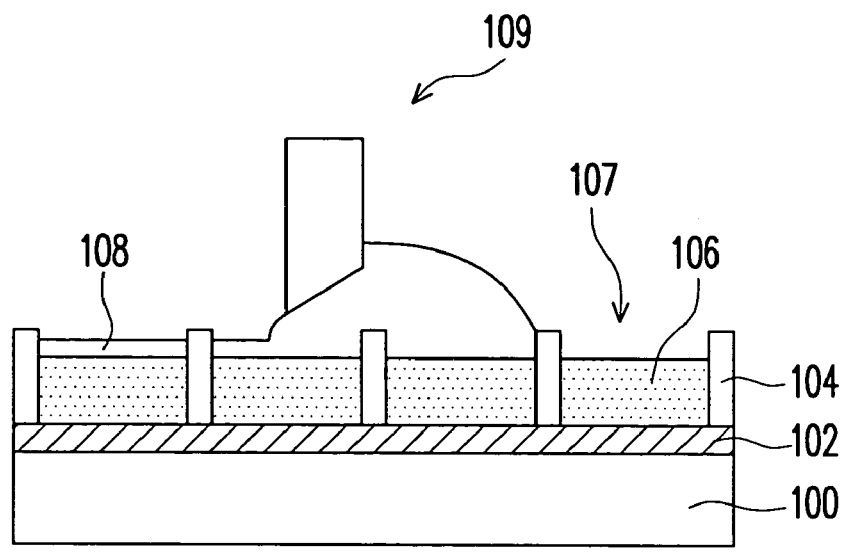

After that, referring to FIG. 1C, a sealing layer 108 is formed on the microcups 105 filled with the display medium 106, i.e. the display unit cells 107. The method of forming the sealing layer 108 on the microcups 105 filled with the display medium 106 includes an ink jet printing or coating method. FIG. 1C shows that the sealing layer 108 is coated over the display unit cells 107 through the blade coating, but the present invention is not limited to this. Specifically, the sealing layer 108 includes a first material that is immiscible with the display medium 106 and a second material that is miscible with the display medium 106. In one preferred embodiment, the density of the first material is lower than that of the display medium 106, such that the first material of the sealing layer 108 floats over the surface of the display medium 106 because the first material is immiscible with the display medium 106. Additionally, the materials of the first and second materials are selected from polymers, monomers, prepolymers, and combinations thereof, respectively. For the selection of the materials of the first and second materials, besides that the first material is immiscible with the display medium 106 and the second material is miscible with the display medium 106, the first material is solidified through a specific treatment process and the second material undergoes a polymerization induced phase separation reaction through the specific treatment process. In the sealing layer 108, the proportion of the first material falls between, for example, 10~99.99%, and that of the second material falls between, for example, 90~0.01%. Preferably, the proportion of the first material falls between, for example, 20~99%, and that of the second material falls between, for example, 80~1%. Of course, in the present invention, the sealing layer 108 may comprise other secondary components, besides the first and second materials.

It is notable that if the second material in the sealing layer 108 is a photo-alignable material, a radiation exposure treatment is then performed on the second material. As such, the display medium 106 is aligned by the second material. In one embodiment, the material of the second material in the sealing layer 108 is a photo-dimerization material, such as a polymer material containing cinnamoyl or coumarin. After irradiated by the polarized ultraviolet, an anisotropic cross-linked structure product is obtained, which is capable of aligning the display medium 106.

Figure 1D:
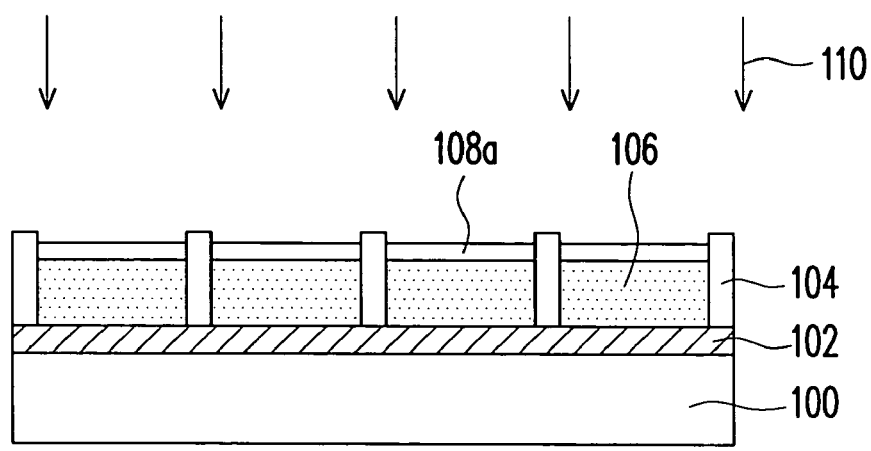

Then, referring to FIG. 1D, a treatment process 110 is performed, such that the first material is solidified to form a solidifying layer 108a, and the second material miscible with the display medium 106 undergoes a polymerization induced phase separation reaction so as to precipitate there-from. The treatment process is, for example, radiation exposure, heating, or humidity change. The method adopted by the treatment process 110 is determined depending on the property of the first and second materials in the sealing layer 108. The formed solidifying layer 108a is used to protect the display medium 106. The structure of the precipitate precipitated in the display medium 106 is different depending on the proportion of the second material, and different alignment effects are obtained depending on the formed structures, such that they can be applied to different display modes, which will be described in detail later.

Figure 1E:
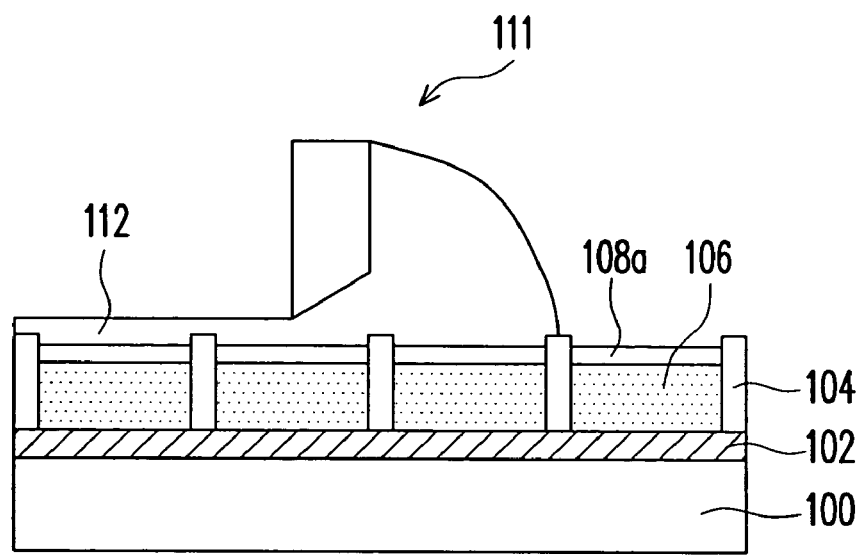
Figure 1F:
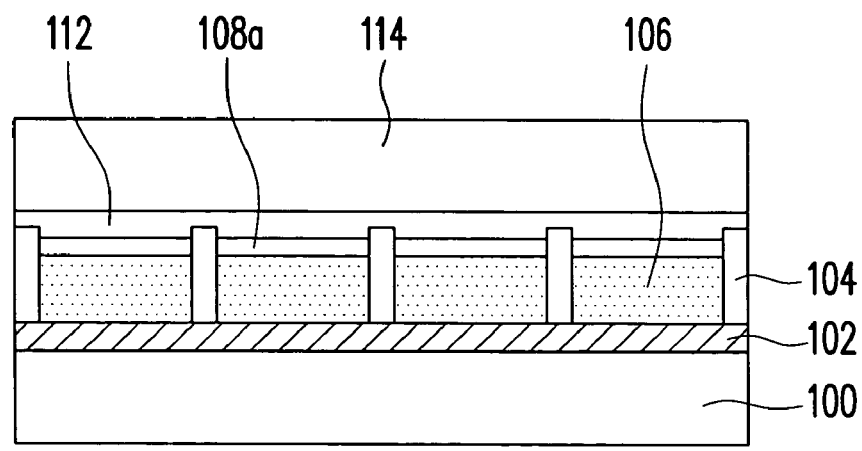

After the solidifying layer 108a is formed on the surface of the display medium 106 and the precipitate is formed in the display medium 106, another substrate 114 is disposed on the solidifying layer 108a, such that the substrate 114 and the substrate 100 formed with the microcups are attached together, as shown in FIG. 1F. In one preferred embodiment, the method of attaching the substrates 114 and 100 comprises coating an adhesive layer 112 over the solidifying layer 108a with, for example, the blade coating 111, as shown in FIG. 1E; attaching the substrate 114 to the adhesive layer 112, as shown in FIG. 1F; and then, performing a step of illuminating or baking to harden the adhesive layer 112, so as to form a display panel.

Figure 2A:
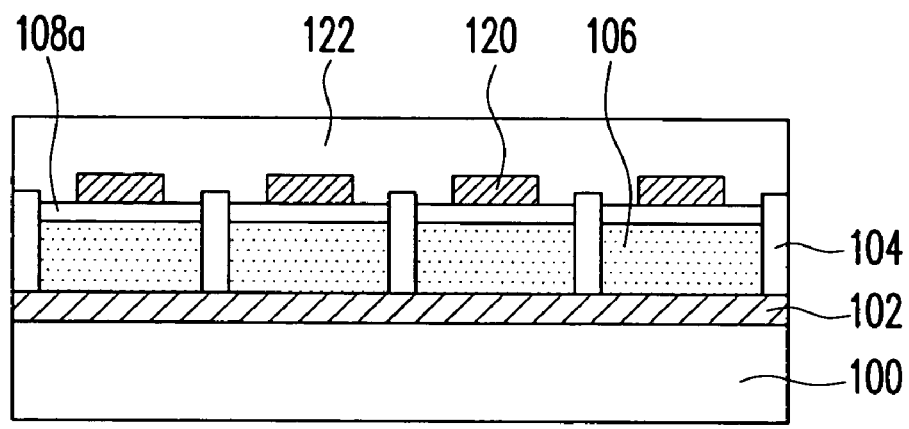
FIGS. 2A-2D show schematic sectional views of the display panel according to several embodiments of the present invention.

In another embodiment of the present invention, subsequent to the step shown in FIG. 1D, i.e. after the solidifying layer 108a is formed, as shown in FIG. 2A, a device layer 120, such as an electrode or drive device, may also be directly formed on the solidifying layer 108a, and then a cover layer 122 is formed on the device layer 120, so as to form a display panel.

Figure 2B:
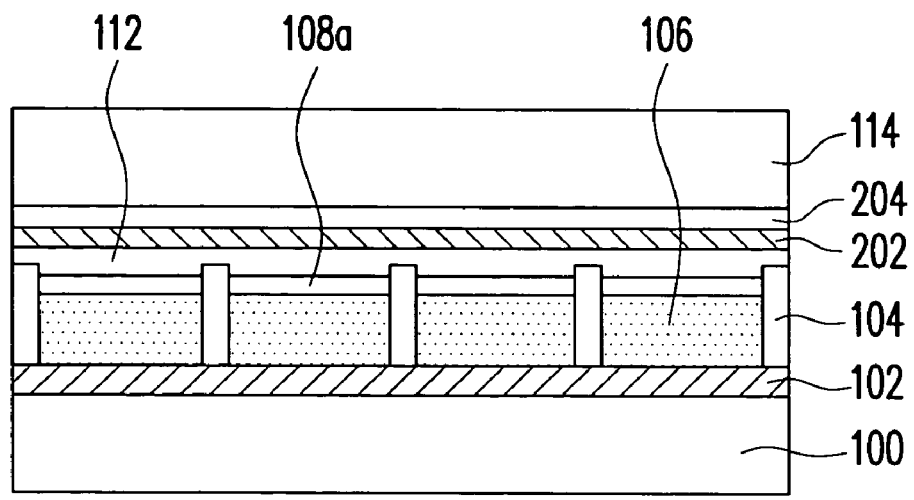

In other embodiments of the present invention, the display panel further includes other film layers, for example, for the display panel in FIG. 2B, before the substrates 114 and 100 are attached, a color filter layer 204 is formed on the substrate 114, and a device layer 202, such as an electrode or drive device, is formed on the color filter layer 204. Therefore, the display panel shown in FIG. 2B is a full color display panel.

Figure 2C:
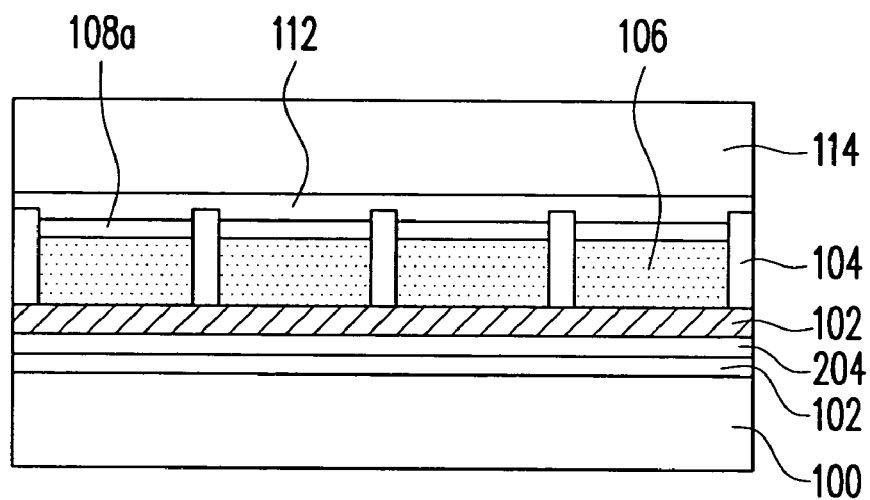

Additionally, as shown in FIG. 2C, the color filter layer 204 is also formed on the substrate 100, and the color filter layer 204 is formed on the device layer 102. Therefore, in the embodiment shown in FIG. 2C, after the color filter layer 204 is formed on the substrate 100 or the device layer 102, the wall structure 104 is formed on the color filter layer 204.

Figure 2D:
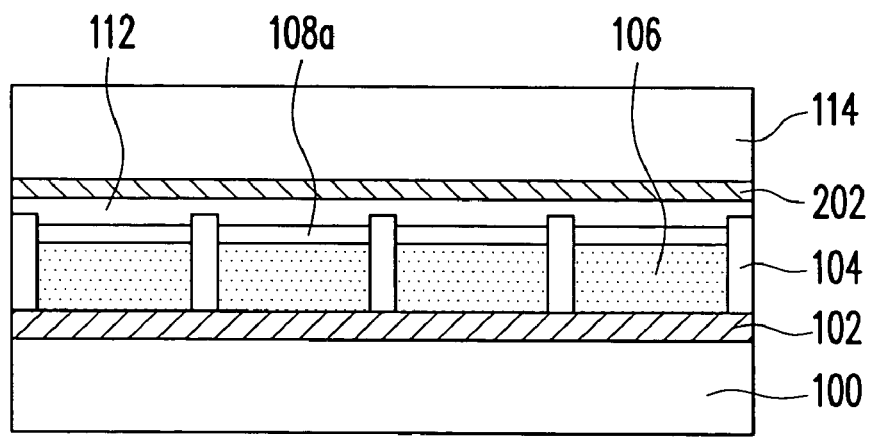

In the present invention, the color filter layer is not necessary in the display panel, for example, in the display panel shown in FIG. 2A, the color filter layer is not formed. Additionally, in the display panel shown in FIG. 2D, a device layer 202 is formed on the substrate 114, while the color filter layer is not formed.

Generally, the display panel in the present invention mainly comprises the substrate, the microcups formed on the substrate, the display medium, and the sealing layer, and other device layers, color filter layers, and other film layers may be added in appropriate positions depending on the requirements of the design of an actual display panel.

In the step of forming the sealing layer, as described above, due to the proportion of the first and second materials in the sealing layer, the structures of the precipitate precipitated in the display medium are different after the step of treatment. Further, different alignment effects may be achieved depending on the different structures of the precipitate, such that they can be applied to different display modes, which will be described in detail below.

Referring to FIGS. 3A, 3B, 3C, and 3D, they show the schematic sectional views of the single microcup, respectively. More specifically, the solidifying layer 108a is formed on the surface of the display medium 106 in each microcup on the substrate 100, and the structures of the precipitate in the display medium 106 are different.

Figure 3A:
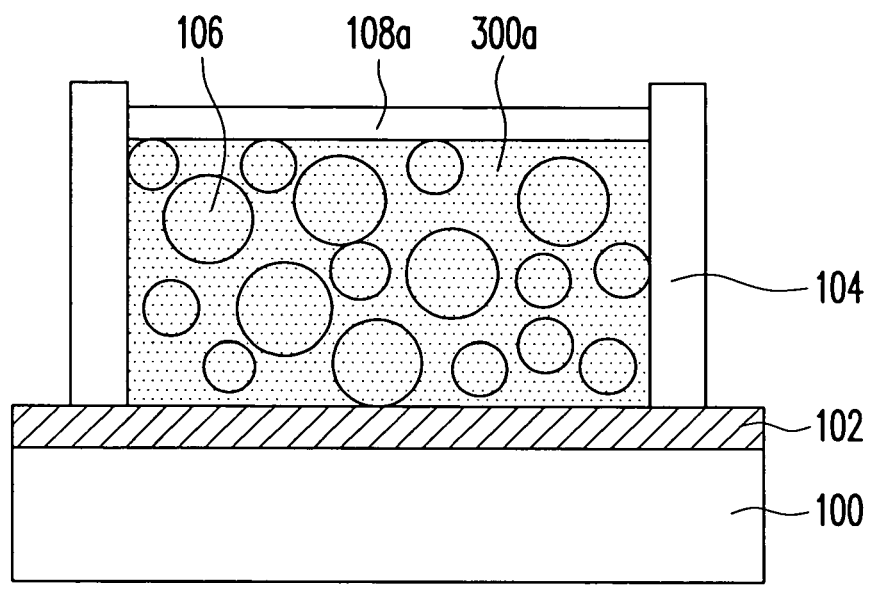
FIGS. 3A-3D show schematic views of the precipitate and the display medium formed in a single microcup, respectively.

In the embodiment shown in FIG. 3A, prior to the treatment step, such as an radiation exposure, heating, or humidity change, the second material of the sealing layer on the microcups is miscible with the display medium in the proportion of 20~70%. The concentration of the second material in the solution of the sealing layer may be calculated through the volume of the liquid coated on the microcups and the volume of the display medium filled in the microcups. Herein, since the concentration of the second material miscible with the display medium is higher and the reaction is more rapid, the second material miscible with the display medium rapidly undergoes the polymerization induced phase separation reaction when the treatment process is performed. At this time, the precipitated precipitate 300a forms a continuous phase and the display medium 106 forms suspension liquid droplets distributing in the continuous phase. Such structure is also referred to as a polymer dispersed liquid crystal (PDLC). The PDLC structure is of great advantage to be applied to displays which generate black-white contrast through the light scattering principle.

Figure 3B:
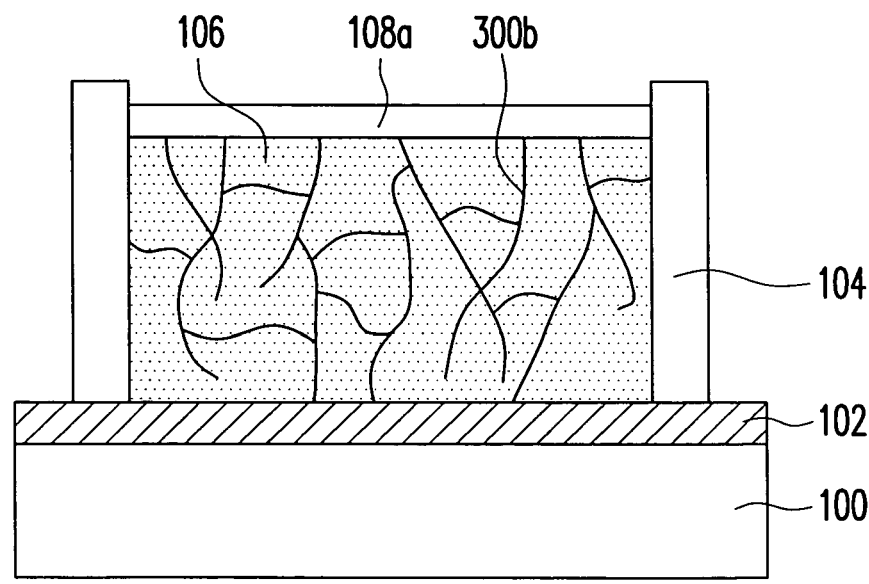

In the embodiment shown in FIG. 3B, prior to the treatment step, such as the radiation exposure, heating, or the humidity change, the second material of the sealing layer on the microcups is miscible with the display medium in the proportion of 10~20%. The concentration of the second material in the solution of the sealing layer may be calculated through the volume of the liquid coated on the microcups and the volume of the display medium filled in the microcups. Herein, since the concentration of the second material miscible with the display medium is lower but the reaction is still rapid, the second material miscible with the display medium rapidly undergoes the polymerization induced phase separation reaction when the treatment process is performed. However, the precipitated precipitate 300b distributes in the display medium in the shape of a cross-linked chain. Such structure is also referred to as a polymer network liquid crystal (PNLC). The PNLC structure is of great advantage to be applied to displays in which the liquid crystals are vertically aligned.

Figure 3C:
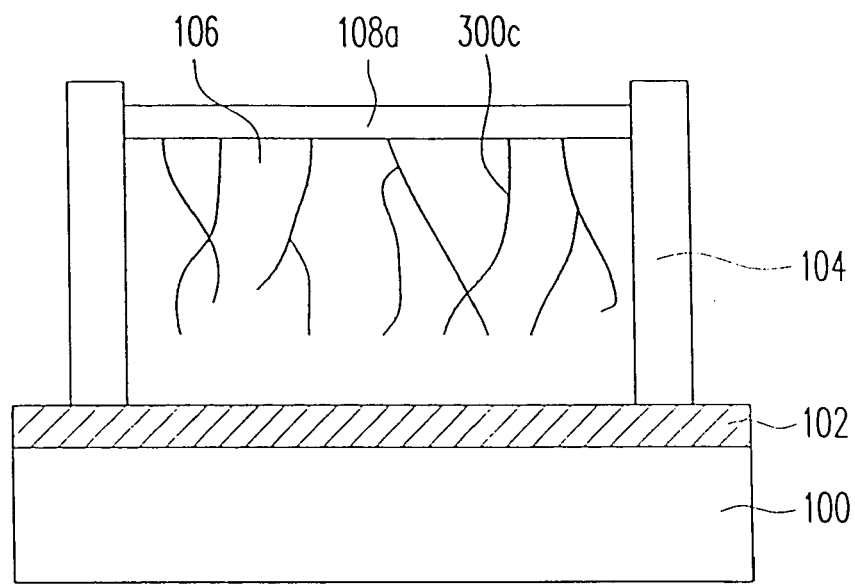

In the embodiment shown in FIG. 3C, prior to the treatment step, such as the radiation exposure, heating, or the humidity change, the second material of the sealing layer on the microcups is miscible with the display medium in the proportion of 1~10%. The concentration of the second material in the solution of the sealing layer may be calculated through the volume of the liquid coated on the microcups and the volume of the display medium filled into the microcups. Herein, since the concentration of the second material miscible with the display medium is lower, the second material miscible with the display medium rapidly undergoes the polymerization induced phase separation reaction when the treatment process is performed. However, even though the precipitated precipitate 300c is insufficient to form a mesh structure, the precipitate 300c may still stabilize the display medium 106. Such structure is also referred to as a polymer stabilized liquid crystal (PSLC).

Figure 3D:
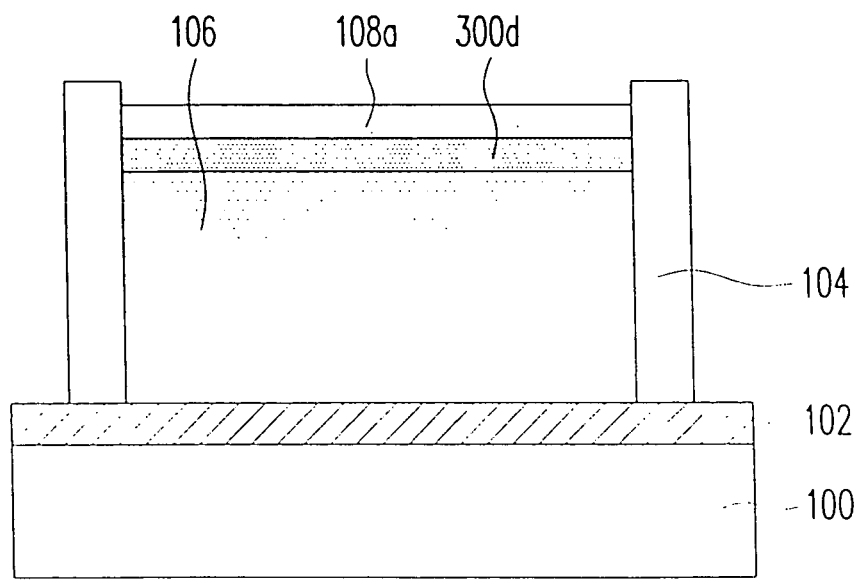

In the embodiment shown in FIG. 3D, prior to the treatment step, such as the radiation exposure, heating, or the humidity change, the second material of the sealing layer on the microcups is miscible with the display medium in the proportion of 10~70%. Herein, since the mass transfer rate of the second material in the display medium is greater than the polymerization reaction rate, the second material miscible with the display medium rapidly undergoes the polymerization induced phase separation reaction when the treatment process is performed, wherein the precipitated precipitate 300d is mostly separated from the display medium 106. Therefore, the separated precipitate 300d forms a simple film. Such structure is also referred to as a phase separated composite structure (PSCOS). The PSCOS structure is of great advantage to be applied to displays in which the display medium is horizontally aligned.

In view of the above, the proportion of the first and second materials in the sealing layer is adjusted, as well as the concentration of the materials in the solution of the sealing layer, so as to achieve different alignment effects for the display medium in the microcups. Therefore, the materials may be applied in various display modes. Several examples are listed below to illustrate the application of each display mode.

Cholesteric Liquid Crystal Display Panel

For example, for a cholesteric liquid crystal display panel, the conditions for PNLC and PSCOS may be applied to the cholesteric liquid crystal panel. That is, the liquid crystal layer in the microcups applies the cholesteric liquid crystals. Preferably, before the cholesteric liquid crystals are filled in, an appropriate alignment treatment is performed on the surface of the wall structure. The second material formed in the sealing layer on the microcups is miscible with the cholesteric liquid crystals. Subsequent to the treatment process, such as radiation exposure, heating, or humidity change, a polymer stabilized cholesteric liquid crystal (PSCC) structure is formed under the condition of PNLC. If the treatment process, such as radiation exposure, heating, or humidity change, is performed under the condition of PSCOS, a surface stabilized cholesteric liquid crystal (SSCC) structure is formed.

Figure 4A:
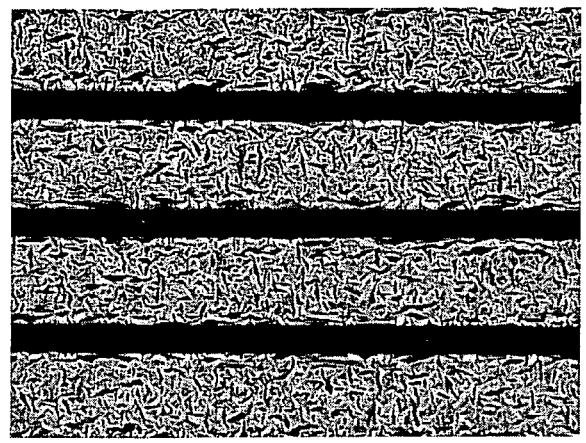
FIGS. 4A-4C show the structures of the precipitate precipitated in the liquid crystal layer after the cholesteric liquid crystals are miscible with the DPHA having different concentrations and then illuminated, respectively.
Figure 4B:
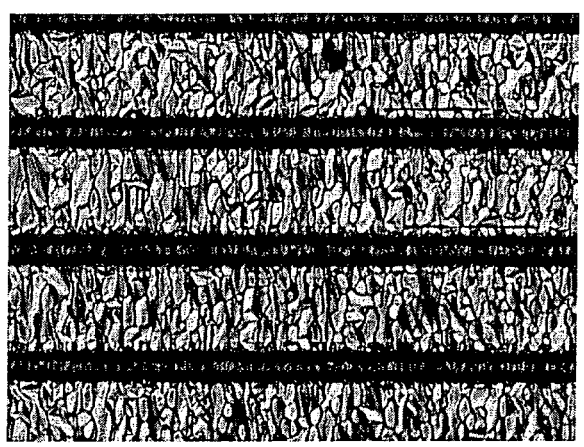
Figure 4C:
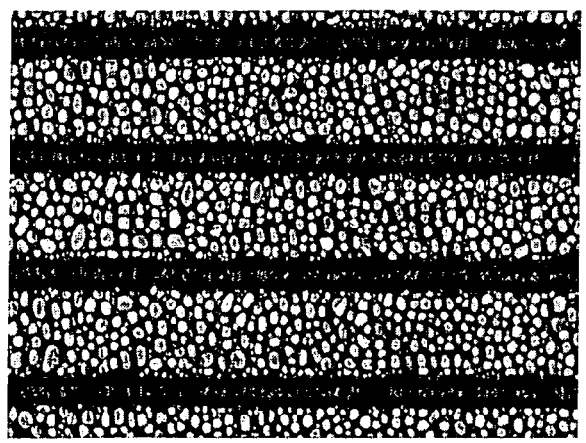

In one embodiment, the epoxy resin that is immiscible with the cholesteric liquid crystal is used as the first material in the sealing layer, and the dipentaerythritol penta hexa acrylate (DPHA) that is miscible with the cholesteric liquid crystal is used as the second material in the sealing layer. When the proportion of DPHA in the solution of the sealing layer is 1%, 5%, and 10%, the formed structures are as shown in FIGS. 4A, 4B, and 4C, respectively, wherein the liquid crystal in FIG. 4A presents the PSLC structure, the liquid crystal in FIG. 4B presents the PNLC structure, and the liquid crystal in FIG. 4C presents the PDLC structure.

Figure 5A:
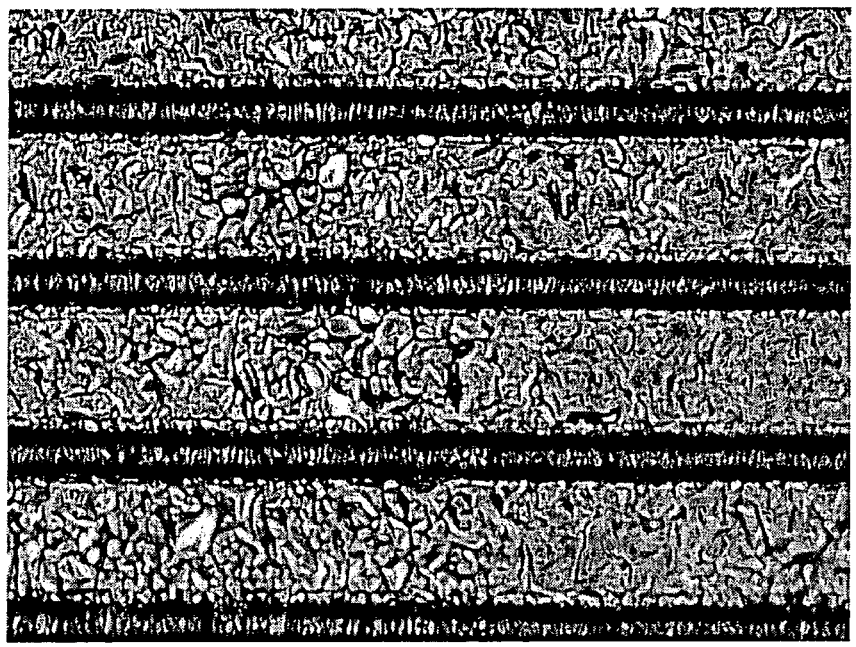
FIGS. 5A-5B show the structures of the precipitate precipitated in the liquid crystal layer after the cholesteric liquid crystals are miscible with the NOA74 having different concentrations and then illuminated, respectively.
Figure 5B:
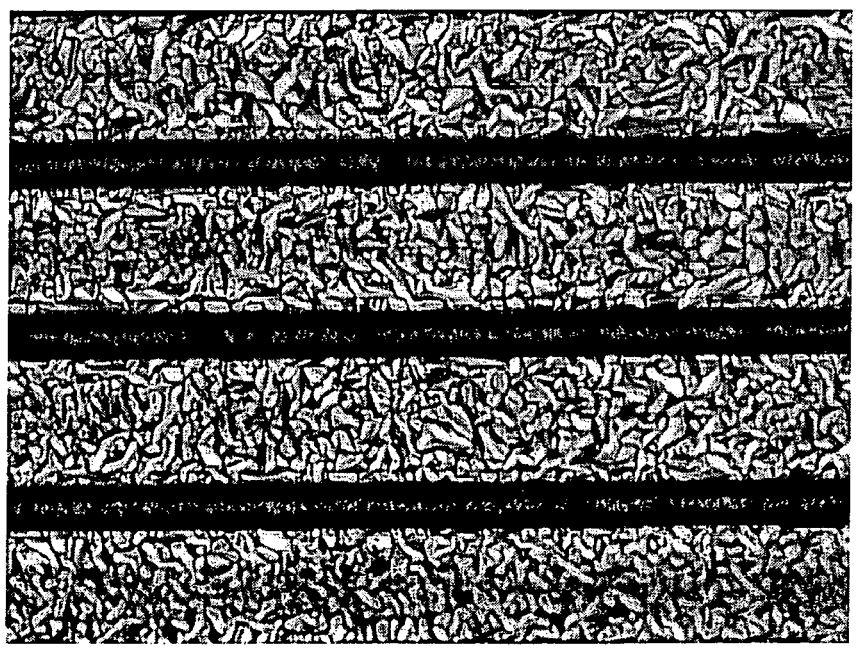

In another embodiment, epoxy resin is used as the first material in the sealing layer, which is immiscible with the cholesteric liquid crystal, and NOA74, the product produced by Norland Products INC., is used as the second material in the sealing layer, which is miscible with the cholesteric liquid crystal. When the proportion of NOA74 in the solution of the sealing layer is 1% and 5%, the formed structures are as shown in FIGS. 5A and 5B, respectively, wherein the liquid crystal in FIG. 5A presents the PSLC structure, and the liquid crystal in FIG. 5B presents the PNLC structure.

Vertically Aligned Liquid Display Panel

For a liquid display panel which is aligned vertically, the aforementioned condition of PNLC may be applied to the vertically aligned liquid display panel. More specifically, the liquid crystal layer in the microcups is formed of the negative nematic liquid crystals. Preferably, before the negative nematic liquid crystals are filled in, a vertical alignment treatment is performed on the surface of the wall structure. The second material formed in the sealing layer on the microcups is miscible with the negative nematic liquid crystals. Subsequent to the treatment process, such as radiation exposure, heating, or humidity change, the second material miscible with the negative nematic liquid crystals undergoes a polymerization induced phase separation reaction and the precipitated precipitate forms a mesh structure, so as to provide the characteristic of vertical alignment.

Horizontally Aligned Liquid Display Panel

For a liquid display panel which is aligned horizontally, the aforementioned condition of the PSCOS may be applied to the horizontally aligned liquid display panel. More specifically, the liquid crystal layer in the microcups is formed of the positive nematic liquid crystals. Preferably, before the positive nematic liquid crystals are filled in, a horizontal alignment treatment is performed on the surface of the wall structure. The second material formed in the sealing layer on the microcups is miscible with the positive nematic liquid crystals. Subsequent to the treatment process, such as radiation exposure, heating, or humidity change, the second material miscible with the positive nematic liquid crystals undergoes a polymerization induced phase separation reaction and the precipitated precipitate forms a phase separation composite structure, so as to provide the characteristic of horizontal alignment.

Twist Nematic Liquid Display Panel

For a twist nematic liquid display panel, the aforementioned condition of PSCOS may be applied to the twist nematic liquid display panel. More specifically, the liquid crystal layer in the microcups is formed of twist nematic liquid crystals, such as positive nematic liquid crystals mixed with the chiral dopant. Preferably, before the twist nematic liquid crystals are filled in, a horizontal alignment treatment is performed on the surface of the wall structure. The second material formed in the sealing layer on the microcups is miscible with the twist nematic liquid crystals. Subsequent to the treatment process, such as radiation exposure, heating, or humidity change, the second material miscible with the twist nematic liquid crystals undergoes a polymerization induced phase separation reaction and the precipitate forms a phase separation composite structure, so as to provide the characteristic of horizontal alignment. It is notable that the twist angle of the twist nematic liquid crystals is increased with the increase of the quantity of the chiral dopant in the positive nematic liquid crystals.

Sealing Layer Material

The present invention provides a sealing layer material which may be applied to a micro-cup display panel. The sealing layer material comprises a first material having an amount of 10~99.99% and a second material having an amount of 90~0.01%. Preferably, the proportion of the first material, for example, falls between 20~99%, and the proportion of the second material, for example, falls between 80~1%. In particular, the first material is immiscible with a display medium and solidified in the process of radiation exposure, heating, or humidity change. The second material is miscible with a display medium and undergoes a polymerization induced phase separation reaction in the process of radiation exposure, heating, or humidity change, so as to precipitate in the display medium.

In one preferred embodiment, the density of the first material is lower than that of the display medium. The materials of the first and second materials are selected from polymers, monomers, prepolymers, and combinations thereof, respectively. Of course, in the present invention, the sealing layer may comprise other secondary components, besides the first and second materials.

Two examples are listed below to illustrate the method of preparing the sealing layer in the present invention, but the present invention is not limited to the two examples.

EXAMPLE 1

Firstly, the first material immiscible with the liquid crystal is prepared. In the method of preparing, the solid of poly vinyl alcohol (PVA) is added into deionized water to prepare a 10wt % PVA aqueous solution, wherein after the PVA solid is added in the deionized water, it is then heated to 80° C. and stirred for 12 hours. Additionally, NOA63, a product produced by Norland Products INC., is used as the second material, wherein ethanol is used as the solvent, and then the PVA aqueous solution, the ethanol, and the NOA63 are mixed in the proportion of 1:0.98:0.02 by weight. After that, the solution can be used as the sealing layer material after it has been stirred for 12 hours.

EXAMPLE 2

Firstly, the first material immiscible with the liquid crystal is prepared. In the method of preparation, the solid of sp7533, a product produced by 3M, is added into isopropyl alcohol to prepare a 15wt % solution, wherein after the sp7533 is added into the isopropyl alcohol, it is further stirred for 6 hours. Additionally, isobornyl methacrylate and Irgacure 907, products produced by Ciba special chemicals, Switzerland, are used as the second material. The isopropyl alcohol is used as the solvent, and the sp7533, the isopropyl alcohol, the isobornyl methacrylate, and the Irgacure 907 are mixed in the proportion of 1:0.9798:0.02:0.0002 by weight. After that, the solution can be used as the sealing layer material after it has been stirred for 12 hours.

In view of the above, in the sealing layer of the display panel of the present invention, the first material is solidified to form a solidifying layer through a specific treatment process, and the second material undergoes a polymerization induced phase separation reaction through the specific treatment process, so as to precipitate in the display medium. The solidifying layer is used to protect the display medium and the precipitate precipitated in the display medium achieves different alignment effects depending on the structure, so as to be applied to different display modes. As a result, the present invention can solve the problem in the conventional manufacturing method of the micro-cup liquid crystal display panel that the sealing layer on the top of the micro-cup cannot be aligned.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A manufacturing method of a display panel, comprising:
providing a substrate;
forming a wall structure on the substrate to define multiple microcups;
filling a display medium into the microcups;
forming a sealing layer on the microcups filled with the display medium, wherein the sealing layer includes a first material that is immiscible with the display medium and a second material that is miscible with the display medium; and
performing a treatment process, such that the first material is solidified to form a solidifying layer, while the second material miscible in the display medium undergoes a polymerization induced phase separation reaction so as to precipitate in the display medium.

2. The manufacturing method of a display panel as claimed in claim 1, wherein the density of the first material is lower than that of the display medium.

3. The manufacturing method of a display panel as claimed in claim 1, wherein the materials of the first material and the second material are selected from polymers, monomers, prepolymers, and combinations thereof, respectively.

4. The manufacturing method of a display panel as claimed in claim 1, wherein the proportion of the first material falls between 10~99.99%, and the proportion of the second material falls between 90~0.01%.

5. The manufacturing method of a display panel as claimed in claim 1, wherein the treatment process includes radiation exposure, heating, or humidity change.

6. The manufacturing method of a display panel as claimed in claim 1, wherein the display medium includes guest-host liquid crystals, twist nematic liquid crystals, or cholesteric liquid crystals.

7. The manufacturing method of a display panel as claimed in claim 1, wherein the second material in the sealing layer can be radiation-alignable materials and after the radiation exposure treatment, the display medium is aligned by the second material.

8. The manufacturing method of a display panel as claimed in claim 1, wherein after the wall structure is formed on the substrate, further comprising performing an alignment treatment process or a plasma surface modification step on the substrate and the surface of the wall structure.

9. The manufacturing method of a display panel as claimed in claim 1, wherein after the solidifying layer is formed, further comprising disposing another substrate on the solidifying layer such that it is attached to the substrate.

10. The manufacturing method of a display panel as claimed in claim 9, wherein a device layer is further formed on the surface of another substrate.

11. The manufacturing method of a display panel as claimed in claim 10, further comprising forming a color filter layer on the device layer.

12. The manufacturing method of a display panel as claimed in claim 9, wherein a color filter layer is further formed on the surface of another substrate.

13. The manufacturing method of a display panel as claimed in claim 1, wherein before the wall structure is formed, further comprising forming a device layer on the substrate.

14. The manufacturing method of a display panel as claimed in claim 13, further comprising forming a color filter layer on the device layer.

15. The manufacturing method of a display panel as claimed in claim 1, wherein before the wall structure is formed, further comprising forming a color filter layer on the substrate.

16. The manufacturing method of a display panel as claimed in claim 1, wherein after the solidifying layer is formed, further comprising forming a device layer on the solidifying layer, and forming a cover layer on the device layer.

17. The manufacturing method of a display panel as claimed in claim 1, wherein the method of forming the wall structure on the substrate includes a photolithographic process or a molding process.

18. The manufacturing method of a display panel as claimed in claim 1, wherein the method of filling the display medium into the microcups includes an ink jet printing or coating method.

19. The manufacturing method of a display panel as claimed in claim 1, wherein the method of forming the sealing layer on the microcups includes an ink jet printing or coating method.

20. A sealing layer material for a display panel, comprising:
   a first material having an amount of 10~99.99%, wherein the first material is immiscible with a display medium and solidified in a process of radiation exposure, heating, or humidity change; and
   a second material having an amount of 90~0.01%, wherein the second material is miscible with the display medium and undergoes a polymerization induced phase separation reaction in the process of radiation exposure, heating, or humidity change, so as to precipitate in the display medium.

21. The sealing layer material for a display panel as claimed in claim 20, wherein the density of the first material is lower than that of the display medium.

22. The sealing layer material for a display panel as claimed in claim 20, wherein the materials of the first material and the second material are selected from polymers, monomers, prepolymers, and combinations thereof, respectively.

* * * * *